A. E. YOUNG.
Door-Knob Extension.

No. 199,771. Patented Jan. 29, 1878.

WITNESSES
B. W. Williams
Geo. B. Williams

Alonzo E. Young INVENTOR

By his Atty's.
Henry W. Williams Jr

UNITED STATES PATENT OFFICE.

ALONZO E. YOUNG, OF BOSTON, MASSACHUSETTS.

IMPROVEMENT IN DOOR-KNOB EXTENSIONS.

Specification forming part of Letters Patent No. 199,771, dated January 29, 1878; application filed August 7, 1877.

*To all whom it may concern:*

Be it known that I, ALONZO E. YOUNG, of Boston, in the county of Suffolk and State of Massachusetts, have invented a new and useful Improvement in Door-Knob Extension, which improvement is fully set forth in the following specification and accompanying drawings.

My invention is an improvement in that class of extension door-knobs and spindles which are so constructed that a knob may be adjusted to a door, whatever its thickness. I fasten a polygonal tube into a hollow glass knob with a proper cement, and into knobs of other material with metal. A thread is cut the whole length of this tube inside, which receives the ordinary square spindle that is threaded on its corners on one end. The shank or socket has a square hole at its end, to adapt it to slide on said spindle, the remainder of its interior being made polygonal, to adapt it to slide over the whole length of the tube. Thus it will be seen that by sliding the socket on the spindle from the tube the spindle may be screwed into or out of the tube, thus increasing or diminishing its length as may be desired, and by sliding the socket onto the tube to its place it embraces both the knob and the spindle, and holds them firmly in their position. The other knob on the other end of the spindle is affixed in the usual manner.

Figure 1:
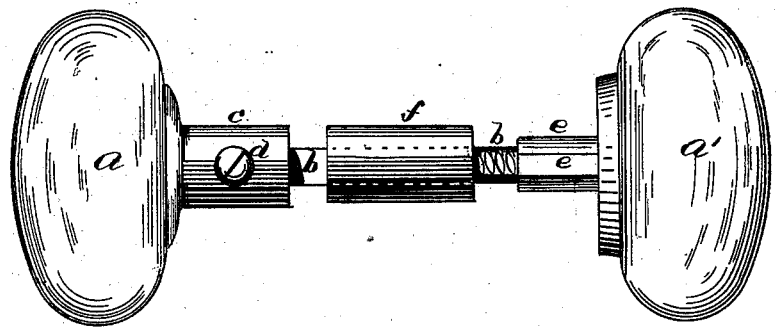
Figure 2:
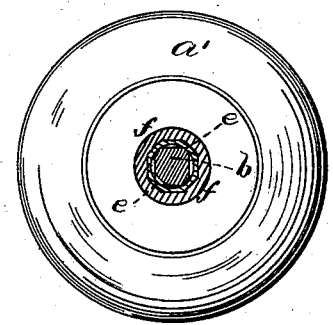
Figure 3:
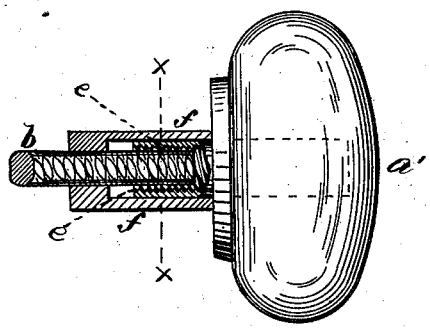

In the accompanying drawings, Figure 1 is an elevation of a pair of door-knobs. Fig. 2 is a section upon line $x\ x$, Fig. 3. Fig. 3 is an elevation of the knob $a'$, and a longitudinal section of the spindle, shank, &c., connected therewith.

Similar letters of reference indicate corresponding parts.

$a\ a'$ represent a pair of door-knobs connected by means of the spindle $b$. The spindle $b$ is provided with a screw-thread, and is held in the shank $c$ by means of the screw $d$, thus being connected with the knob $a$ in the ordinary manner. The spindle $b$ screws into the polygonal post $e$, which is fixed to the opposite knob $a'$. By this means the distance between the two knobs is regulated with reference to the thickness of the door upon which they are placed.

$f$ is a sliding shank, having a polygonal internal surface, and exactly fitting over the whole length of the polygonal post $e$.

While the knobs are being adjusted as to distance apart, the sliding shank $f$ remains in the position seen in Fig. 1. When the knobs have been adjusted the polygonal shank $f$ is slid over and upon the polygonal post $e$, fitting thereupon and locking the knobs so that they are held in position, as seen in Figs. 2 and 3.

The slight variation of the polygonal sides admit of a very nice adjustment, and the extension obtained is nearly the whole interior length of the tube. The simplicity, durability, and cheapness of its construction enable it to be applied to the lowest-priced door-knobs.

I am aware that a patent was granted to G. N. Cummings, July 22, 1862, for a spindle-and-knob attachment, which has the joint in the shank of the knob, and also that a patent was granted to Olney L. Smith, No. 115,650, June 6, 1871, for a similar purpose, but which is accomplished by means of right and left hand screws.

What I claim as my invention is—

The combination of a knob-shank, made polygonal its entire length, and provided with an internal screw-thread, a spindle-screw threaded on its corners, and a flanged sleeve to cover the entire space between the rose and the knob, made to fit over the knob-shank and spindle, to attach the two firmly together after the adjustment, substantially as above described.

ALONZO E. YOUNG.

Witnesses:
HENRY W. WILLIAMS,
L .W. WILLIAMS.